United States Patent
Ming-Chang

(10) Patent No.: US 8,250,714 B2
(45) Date of Patent: Aug. 28, 2012

(54) HANDGRIP FOR HANDLEBAR

(76) Inventor: Chen Ming-Chang, Tainan Hsien (TW)

( * ) Notice: Subject to any disclaimer, the term of this patent is extended or adjusted under 35 U.S.C. 154(b) by 358 days.

(21) Appl. No.: 12/565,820

(22) Filed: Sep. 24, 2009

(65) Prior Publication Data

US 2011/0067204 A1 Mar. 24, 2011

(51) Int. Cl.
*B25G 1/10* (2006.01)
(52) U.S. Cl. ............... 16/421; 16/422; 16/430
(58) Field of Classification Search ........... 16/110.1, 16/421, 422, 430, 436, DIG. 22, DIG. 12; 74/551.1, 551.9, 502.2, 558.5; 403/82, 94, 403/96, 109.1, 110
See application file for complete search history.

(56) References Cited

U.S. PATENT DOCUMENTS

| | | | | |
|---|---|---|---|---|
| 5,139,358 A | * | 8/1992 | Kodama et al. | 403/7 |
| 5,784,924 A | * | 7/1998 | Wu | 74/473.13 |
| 5,802,927 A | * | 9/1998 | Yu et al. | 74/502.2 |
| 6,067,875 A | * | 5/2000 | Ritchey et al. | 74/502.2 |
| 6,209,413 B1 | * | 4/2001 | Chang | 74/502.2 |
| 6,681,653 B2 | * | 1/2004 | Yu | 74/551.9 |
| 7,013,533 B2 | * | 3/2006 | Lumpkin | 16/421 |
| 7,334,499 B2 | * | 2/2008 | Lai et al. | 74/551.9 |
| 7,712,394 B2 | * | 5/2010 | Wu | 74/551.9 |
| 2007/0157758 A1 | * | 7/2007 | Shih | 74/551.9 |

* cited by examiner

*Primary Examiner* — Victor Batson
*Assistant Examiner* — Robert Delisle
(74) *Attorney, Agent, or Firm* — Yudell Isidore Ng Russell PLLC

(57) ABSTRACT

A handgrip includes a tubular grip body having at least two angularly spaced-apart resilient clamp portions projecting outwardly and axially from an annular end thereof, a substantially U-shaped rod member having a bight portion, and non-threaded head and threaded end portions, and a sleeve ring sleeved around the resilient clamp portions and having first and second curved retaining grooves receiving respectively the resilient clamp portions, a head-receiving groove section receiving the non-threaded head portion, and a guide groove section receiving the threaded end portion. A nut member is disposed outwardly of the guide groove section, and engages threadedly the threaded end portion. The nut member pulls the threaded end portion when tightened so that the bight portion pushes one of the resilient clamp portions toward the other resilient clamp portion.

7 Claims, 4 Drawing Sheets

HANDGRIP FOR HANDLEBAR

BACKGROUND OF THE INVENTION

1. Field of the Invention

This invention relates to a handgrip for a handlebar.

2. Description of the Related Art

A conventional handgrip generally assembled on a handlebar of a vehicle or a movable instrument is soft, and has an anti-slip function. The conventional handgrip is usually made of a resilient material, such as rubber, and is formed as a single body. The handgrip is sleeved fittingly on the handlebar. Although the conventional handgrip can achieve its intended purpose, after a period of use, the handgrip will become loose and unstable due to material fatigue, so that the handgrip and the handlebar are likely to rotate relative to each other.

SUMMARY OF THE INVENTION

Therefore, the object of the present invention is to provide a handgrip that can be secured stably and assembled quickly and easily to a handlebar.

According to this invention, a handgrip for a handlebar comprises a tubular grip body and a fastening unit. The tubular grip body is adapted to be sleeved on the handlebar, and has an annular end, and at least two angularly spaced-apart resilient clamp portions projecting outwardly and axially from the annular end. The fastening unit is disposed in proximity to the annular end, and includes a sleeve ring, a substantially U-shaped rod member, and a nut member. The U-shaped rod member has a bight portion, a non-threaded head portion connected to one end of the bight portion and having a head end, and a threaded end portion connected to the other opposite end of the bight portion. The sleeve ring is sleeved around the resilient clamp portions, and has a first curved retaining groove receiving one of the resilient clamp portions, a second curved retaining groove angularly spaced apart from the first curved retaining groove and receiving the other one of the resilient clamp portions, a head-receiving groove section disposed between the first and second curved retaining grooves to receive the non-threaded head portion, a guide groove section disposed between the first and second curved retaining grooves oppositely of the head-receiving groove section to receive the threaded end portion, and a circumferential wall extending around the first and second curved retaining grooves, the head-receiving groove section, and the guide groove section. The bight portion is received in the second curved retaining groove to abut against an outer surface of said other one of the resilient clamp portions. The head-receiving groove section has a head-engaging portion engaged to the head end. The nut member is disposed outwardly of the guide groove section, and engages threadedly the threaded end portion. The nut member pulls the threaded end portion when tightened so that the bight portion pushes said other one of the resilient clamp portions toward said one of the resilient clamp portions.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Referring to FIGS. 1 to 4, a handgrip according to the preferred embodiment of the present invention is adapted to be installed detachably on a handlebar 1, and is shown to comprise a tubular grip body 2, and first and second fastening units 9, 9'.

Figure 1:
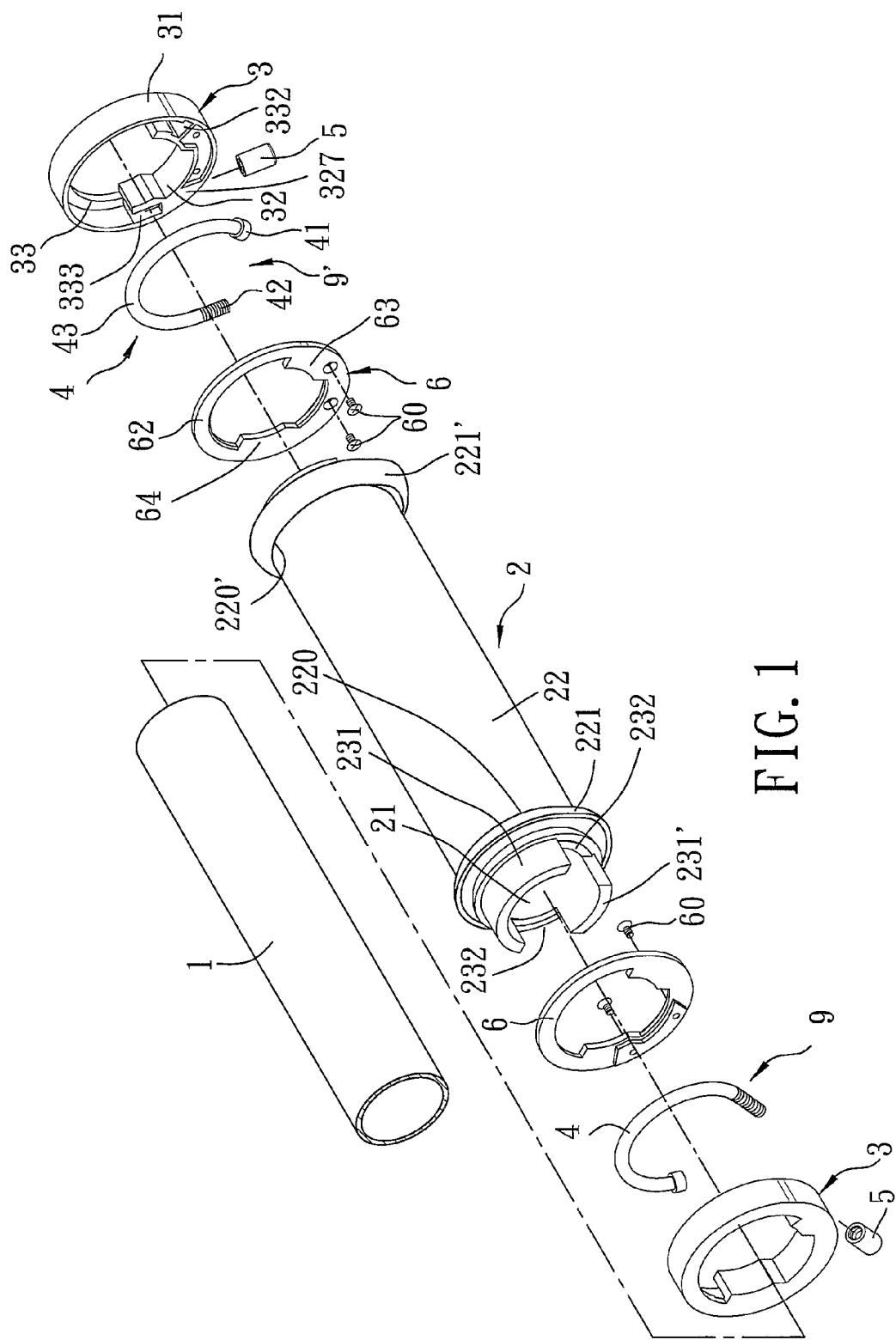
FIG. 1 is an exploded perspective view of a handgrip according to the preferred embodiment of the present invention.
Figure 2:
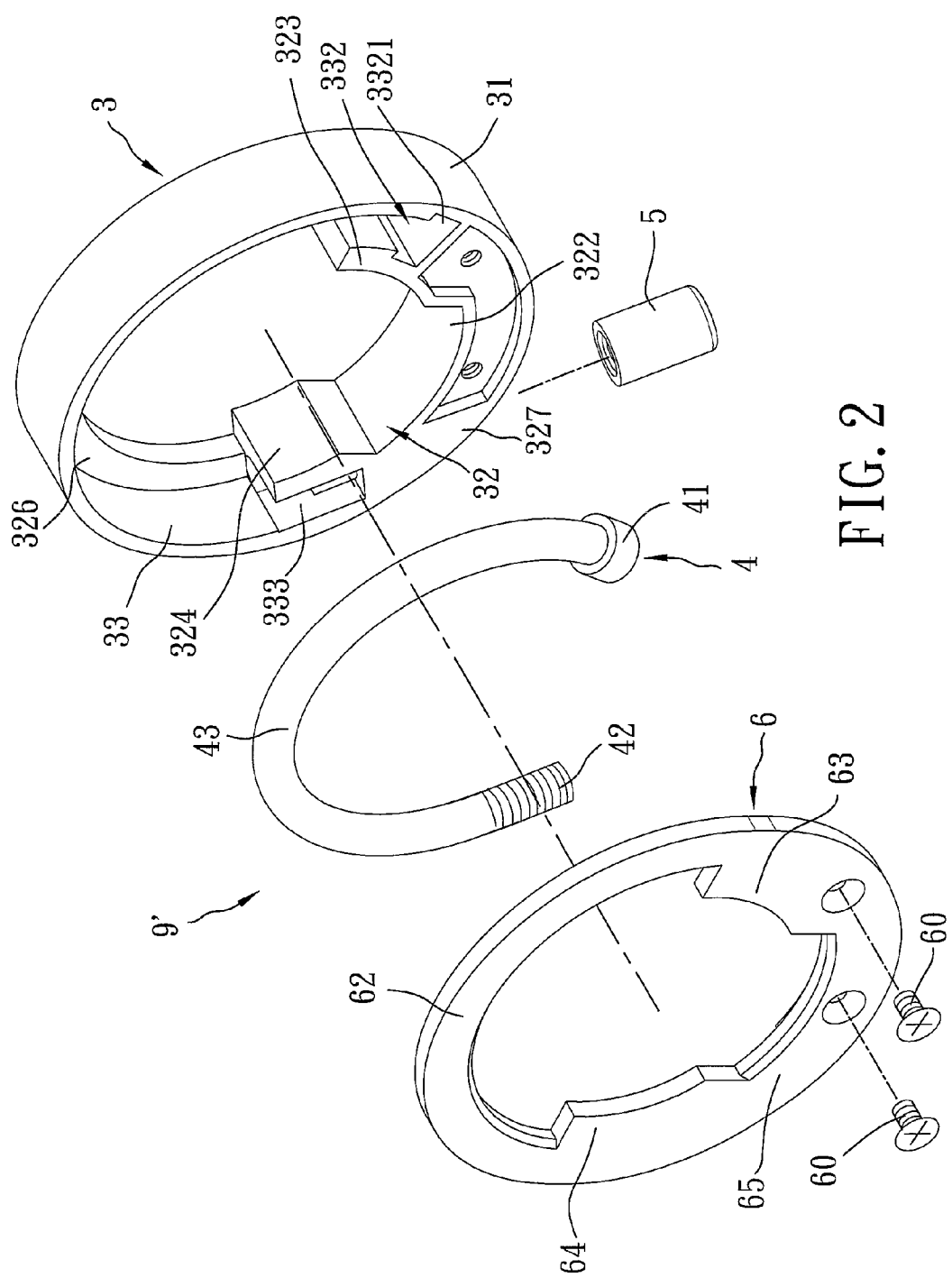
FIG. 2 is an enlarged exploded perspective view of a fastening unit of the preferred embodiment.

The tubular grip body 2 is adapted to be sleeved on the handlebar 1, and includes an outer tube 22 having opposite annular first and second ends 220, 220', and an inner tube 21 inserted fittingly into the outer tube 22 and having at least two angularly spaced-apart resilient clamp portions 231, 231' projecting outwardly and axially from a corresponding one of the first and second ends 220, 220' (only the clamp portions 231, 231' that project outwardly, oppositely, and axially from the first end 220 are visible in FIG. 1), and two angularly spaced-apart cutout portions 232 each formed between two adjacent ones of the clamp portions 231, 231'. Each of the first and second ends 220, 220' has an annular flange 221, 221' projecting outwardly and radially therefrom. In this embodiment, two resilient clamp portions 231, 231' project outwardly, oppositely, and axially from a corresponding one of the first and second ends 220, 220'.

Each of the first and second fastening units 9, 9' is disposed in proximity to a respective one of the first and second ends 220, 220', and includes a sleeve ring 3, a substantially U-shaped rod member 4, a nut member 5, and an annular cover plate 6. The sleeve ring 3 is sleeved around the resilient clamp portions 231, 231', and has a first curved retaining groove 32 receiving the resilient clamp portion 231', a second curved retaining groove 33 angularly spaced apart from the first curved retaining groove 32 and receiving the other clamp portion 231, a head-receiving groove section 332 disposed between the first and second curved retaining grooves 32, 33, a guide groove section 333 disposed between the first and second curved groove sections 32, 33 oppositely of the head-receiving groove section 332, a nut-receiving recess 34 communicated with the guide groove section 333, a slot 328 communicated with the guide groove section 333 and the nut-receiving recess 34, and a circumferential wall 31 extending around the first and second curved retaining grooves 32, 33, the head-receiving groove section 332, and the guide groove section 333. The circumferential wall 31 has an outer circumferential surface formed with a single opening 311 in communication with the nut-receiving recess 34.

The sleeve ring 3 further has two limiting bumps 323, 324 angularly spaced apart from each other and projecting inwardly from the circumferential wall 31, and a land 327 projecting inwardly from the circumferential wall 31 between the limiting bumps 323, 324. The first curved retaining groove 32 is defined between the limiting bumps 323, 324, and has a groove bottom wall 322 formed on the land 327 and abutting against the resilient clamp portion 231'. The head-receiving groove section 332 and the guide groove section 333 are formed respectively in the limiting bumps 323, 324. The limiting bumps 323, 324 extend fittingly and respectively into the cutout portions 232. An endwall 326 projects inwardly and radially from a peripheral end of the circumferential wall 31 between the limiting bumps 323, 324. The second curved retaining groove 33 is bounded by the circumferential wall 31 and the endwall 326.

The substantially U-shaped rod member 4 has a bight portion 43, a non-threaded head portion 41 connected to one end of the bight portion 43, and a threaded end portion 42 connected to the other opposite end of the bight portion 43. The head-receiving groove section 332 has a head-engaging portion 3321 to engage the non-threaded head portion 41 when the U-shaped rod member 4 is assembled on the sleeve ring 3.

The nut member 5 is disposed in the nut-receiving recess 34 outwardly of the slot 328 to engage threadedly the threaded end portion 42 of the U-shaped rod member 4. The nut member 5 has one end provided with an internally threaded hole 51 to engage the threaded end portion 42, and the other opposite end provided with a tool-receiving groove 52 (see FIG. 3).

The annular cover plate 6 has a cover circumferential wall 62, two angularly spaced-apart protrusions 63, 64 projecting inwardly from the cover circumferential wall 62 and respectively aligned with the limiting bumps 323, 324, and a web 65 (see FIG. 2) formed between the protrusions 63, 64 and aligned with the land 327.

Figure 3:
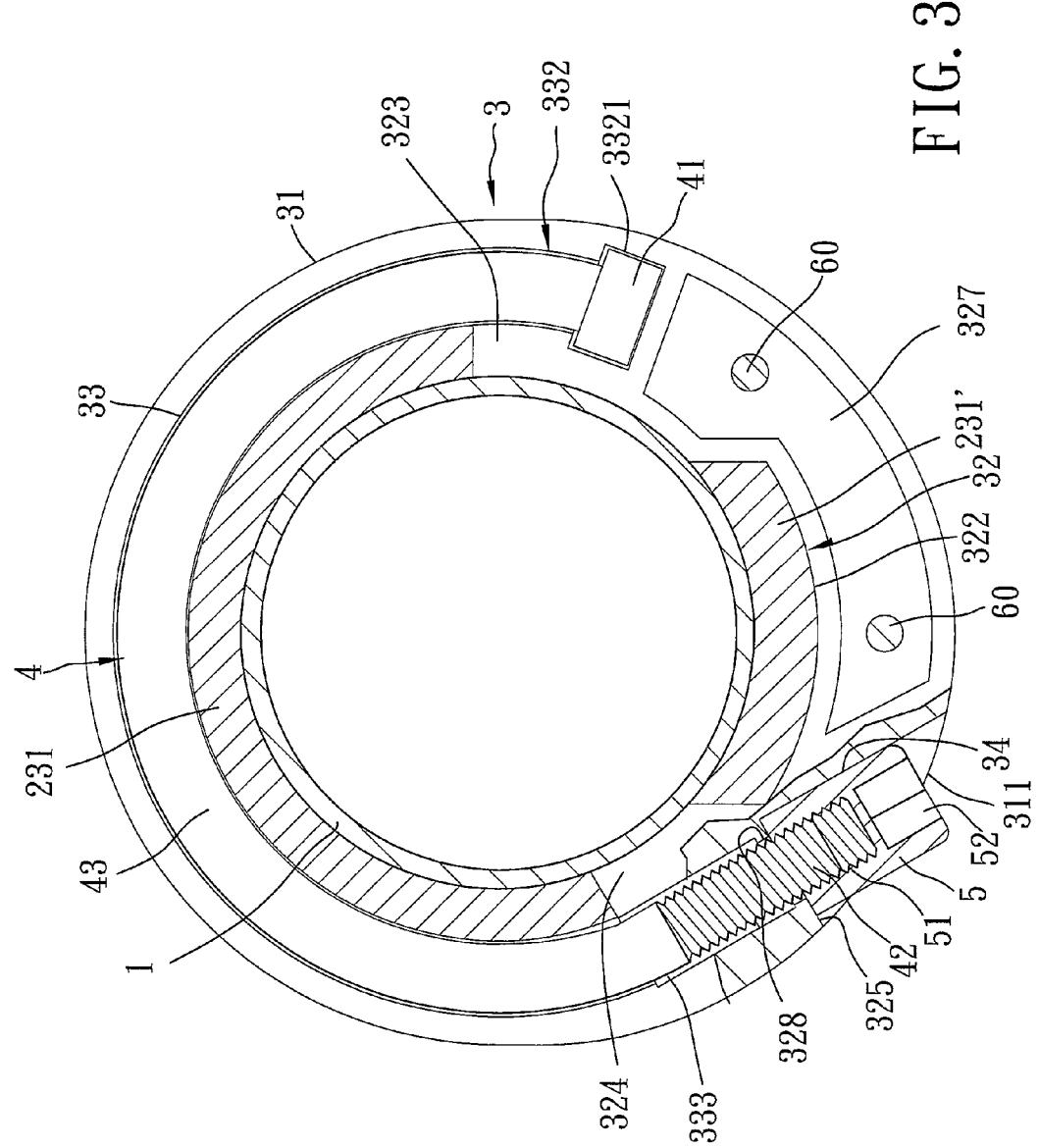
FIG. 3 is a cross-sectional view of the preferred embodiment in an assembled state.

To assemble each fastening unit 9, 9', the U-shaped rod member 4 is first disposed within the sleeve ring 3 with the bight portion 43 thereof received in the second curved retaining groove 33, the non-threaded head portion 41 thereof received in the head-receiving groove section 332 and engaged to the head-engaging portion 3321, and the threaded end portion 42 thereof received in the guide groove section 333 and extending outwardly of the slot 328. Next, the nut member 5 is engaged to the threaded end portion 42. The cover plate 6 is then connected to the land 327 of the sleeve ring 3 oppositely of the endwall 326 by using a pair of screws 60, thereby disposing the U-shaped rod member 4 between the endwall 326 and the cover plate 6. Hence, the U-shaped rod member 5 is retained stably within the sleeve ring 3. At this time, the U-shaped rod member 4 is in a loosened state, as best shown in FIG. 3.

Prior to installation of the handgrip of the present invention on the handlebar 1, the first and second fastening units 9, 9' are first sleeved on the resilient clamp portions 231, 231' at the respective first and second ends 220, 220' of the tubular grip body 2 with the cover plates 6 thereof abutting respectively against the annular flanges 221, 221' of the first and second end 220, 220'. The resilient clamp portions 231, 231' extend into the first and second curved retaining grooves 32, 33 in the sleeve rings 3 of the respective fastening units 9, 9', thereby preventing rotation of the sleeve rings 3 relative to the tubular grip body 2.

Figure 4:
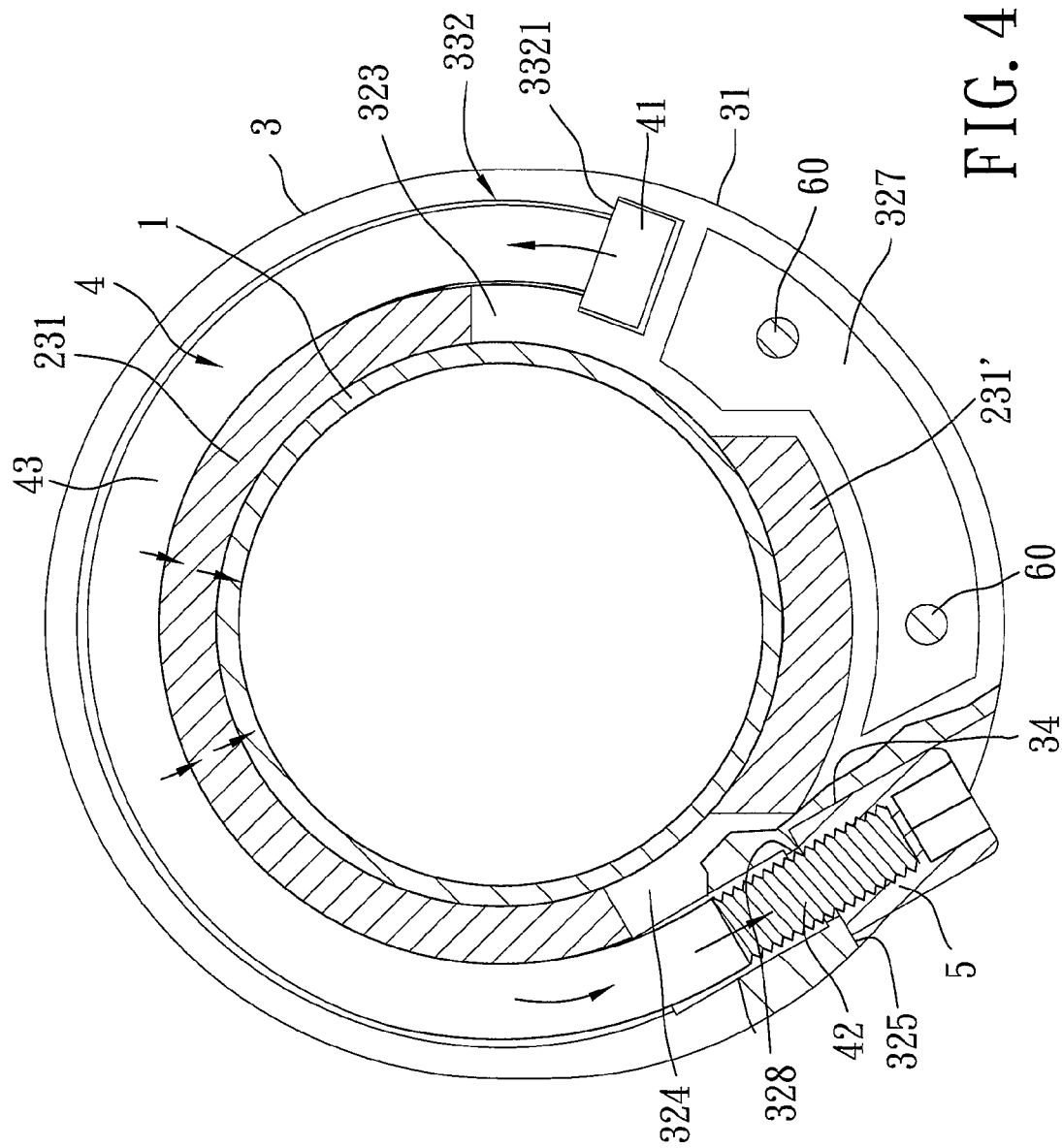
FIG. 4 is a view similar to FIG. 3, but illustrating a threaded end portion of a substantially U-shaped rod member being pulled downwardly by a nut member when tightened.

With reference to FIGS. 1 and 4, after the assembly of the tubular grip body 2 and the first and second fastening units 9, 9' is sleeved on the handlebar 1, the nut members 5 of the fastening units 9, 9' are tightened. During the tightening of each nut member 5, since the non-threaded head portion 41 of the U-shaped rod member 4 is engaged fixedly to the head-engaging portion 3321 of the head-receiving groove section 332, as the nut member 5 is rotated, the threaded end portion 42 of the U-shaped rod member 4 is pulled downwardly, as shown by the arrows in FIG. 4, which in turn also pulls downwardly the bight portion 43, so that the bight portion 43 pushes the clamp portion 231 toward other clamp portion 231', thereby clamping therebetween the handlebar 1 and preventing movement of the handgrip of the present invention relative to the handlebar 1. The nut member 5 is rotated until it abuts against an abutment surface 325 that is adjacent to the nut-receiving recess 34.

It is worth mentioning that during installation of the handgrip of the present invention on the handlebar 1, only a single nut member 5 needs to be rotated to operate the U-shaped rod member 4 between a loosened state (see FIG. 3) and a tightened state (see FIG. 4). Hence, regardless of whether a single nut member 5 or both nut members 5 is/are tightened, the handgrip of the present invention not only can be secured stably to the handlebar 1, but the installation of the handgrip on the handlebar 1 is also quick and easy.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A handgrip for a handlebar comprising:
   a tubular grip body adapted to be sleeved on the handlebar, and having an annular first end, and at least two angularly spaced-apart resilient clamp portions projecting outwardly and axially from said annular first end; and
   a first fastening unit in proximity to said annular first end and including a sleeve ring, a substantially U-shaped rod member, and a nut member, said U-shaped rod member having a bight portion, a non-threaded head portion connected to one end of said bight portion, and a threaded end portion connected to the other opposite end of said bight portion, said sleeve ring being sleeved around said resilient clamp portions and having a first curved retaining groove receiving one of said resilient clamp portions, a second curved retaining groove angularly spaced apart from said first curved retaining groove and receiving the other one of said resilient clamp portions, a head-receiving groove section disposed between said first and second curved retaining grooves to receive said non-threaded head portion, a guide groove section disposed between said first and second curved retaining grooves oppositely of said head-receiving groove section to receive said threaded end portion, and a circumferential wall extending around said first and second curved retaining grooves, said head-receiving groove section, and said guide groove section, said bight portion being received in said second curved retaining groove to abut against said other one of said resilient clamp portions, said head-receiving groove section having a head-engaging portion engaged to said non-threaded head portion, said nut member being disposed outwardly of said guide groove section and engaging threadedly said threaded end portion;
   wherein said nut member pulls said threaded end portion when tightened so that said bight portion pushes said other one of said resilient clamp portions toward said one of said resilient clamp portions;
   wherein said sleeve ring further has two limiting bumps angularly spaced apart from each other and projecting inwardly from said circumferential wall, and a land projecting from said circumferential wall between said limiting bumps, said first curved retaining groove being defined between said limiting bumps and having a groove bottom wall formed on said land, said limiting bumps extending fittingly between said first and second resilient clamp portions, said head-receiving groove section and said guide groove section being formed respectively in said limiting bumps.

2. The handgrip of claim 1, wherein said sleeve ring further has an endwall projecting inwardly and radially from a peripheral end of said circumferential wall between said limiting bumps, said second curved retaining groove being bounded by said circumferential wall and said endwall.

3. The handgrip of claim 2, further comprising an annular cover plate connected to said sleeve ring oppositely of said endwall, said U-shaped rod member being disposed between said endwall and said annular cover plate.

4. The handgrip of claim 3, wherein said annular cover plate has a cover circumferential wall, two angularly spaced-apart protrusions projecting inwardly from said cover circumferential wall and respectively aligned with said limiting bumps, and a web formed between said protrusions and aligned with said land.

5. The handgrip of claim 1, wherein said sleeve ring further has a nut-receiving recess communicated with said guide groove section to receive said nut member, and said circumferential wall has an outer circumferential surface formed with a single opening in communication with said nut-receiving recess.

6. The handgrip of claim 2, wherein said annular first end has an annular flange projecting outwardly and radially therefrom, said handgrip further comprising an annular cover plate connected to said sleeve ring opposite to said endwall, abutting against said annular flange, and retaining said U-shaped rod member within said sleeve ring.

7. The handgrip of claim 1, wherein said tubular grip body further has an annular second end opposite to said annular first end, said handgrip further comprising a second fastening unit in proximity to said annular second end and having a structure similar to that of said first fastening unit.

* * * * *